(12) United States Patent
Sekiya (10) Patent No.: US 9,418,224 B2
(45) Date of Patent: Aug. 16, 2016

(54) PORTABLE ELECTRONIC DEVICE AND CONTROL METHOD OF PORTABLE ELECTRONIC DEVICE

(75) Inventor: Satoshi Sekiya, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1294 days.

(21) Appl. No.: 12/182,814

(22) Filed: Jul. 30, 2008

(65) Prior Publication Data

US 2009/0050702 A1 Feb. 26, 2009

(30) Foreign Application Priority Data

Aug. 20, 2007 (JP) ................. 2007-213879

(51) Int. Cl.
*G06K 19/06* (2006.01)
*G06F 21/55* (2013.01)

(52) U.S. Cl.
CPC .................... *G06F 21/556* (2013.01)

(58) Field of Classification Search
USPC ........................................................ 235/492
See application file for complete search history.

(56) References Cited

U.S. PATENT DOCUMENTS

| 2002/0178349 A1* | 11/2002 | Shibayama | G06F 9/383 712/235 |
| 2005/0132151 A1* | 6/2005 | Kuriyama | G06F 21/445 711/154 |
| 2007/0106878 A1* | 5/2007 | Nguyen | G06F 9/30061 712/207 |
| 2007/0136797 A1* | 6/2007 | Tanabikiq | G06K 17/00 726/6 |
| 2007/0273486 A1 | 11/2007 | Shiotsu et al. | |

FOREIGN PATENT DOCUMENTS

| EP | 1109129 A2 | 6/2001 |
| JP | 2004-139503 | 5/2004 |
| JP | 2005-196730 | 7/2005 |
| JP | 2005-242444 | 9/2005 |
| WO | WO 03/039129 | 5/2003 |

OTHER PUBLICATIONS

French Office Action dated Nov. 25, 2013 for Appln. No. FR 0855618.
Austrian Search Report dated Jun. 5, 2009 for Appln. No. 200805749-9.

\* cited by examiner

*Primary Examiner* — Michael G Lee
*Assistant Examiner* — David Tardif
(74) *Attorney, Agent, or Firm* — Oblon, McClelland, Maier & Neustadt, L.L.P.

(57) ABSTRACT

An IC card stores history information indicating information relating to a command executed for each logical channel in a storage portion and determines the validity of the command based on history information of a logical channel specified by the command stored in the storage portion when the command is supplied from an external device, performs a process corresponding to the command when the validity of the command is determined, and stores information relating to the executed command in the storage portion as history information of the logical channel.

13 Claims, 4 Drawing Sheets

PORTABLE ELECTRONIC DEVICE AND CONTROL METHOD OF PORTABLE ELECTRONIC DEVICE

CROSS-REFERENCE TO RELATED APPLICATIONS

This application is based upon and claims the benefit of priority from prior Japanese Patent Application No. 2007-213879, filed Aug. 20, 2007, the entire contents of which are incorporated herein by reference.

BACKGROUND OF THE INVENTION

1. Field of the Invention

This invention relates to a portable electronic device such as an IC card or IC tag contained in an IC chip in which individual information or transaction information is stored, for example, and a control method of the portable electronic device.

2. Description of the Related Art

Conventionally, contact and non-contact IC cards have serial interfaces of a half-duplex communication system as external communication interfaces. Some of the above IC cards have a function called as a logical channel. In the IC card having the function of the logical channel, a physically single interface can be simulatively used as plural communication interfaces by means of plural channels (logical channels). For example, an application A of an external device can be used to specify a channel 1 and an application B thereof can be used to specify a channel 2. In this case, the external device can communicate with an IC card in a time-sharing fashion by use of the applications A and B. That is, the applications A and B can be operated as if they communicate with the IC card in one-to-one correspondence. In the IC card having the logical channel function as described above, folders or files to be accessed can be managed and controlled independently for each specified channel.

In instructions (commands) supplied from the external device to the IC card, for example, a plurality of instructions such as a random number generation instruction and external authentication instruction that are required to be executed in a preset order are contained. This is to prevent occurrence of dishonest access. The above instructions are not correctly executed if the preset execution order is not maintained.

However, in the conventional IC cards, the instruction execution order is not managed for each logical channel. Therefore, when instructions are received from the external device via plural channels, the order of received instructions may not be set to the preset order in the conventional IC card even if the order of instruction groups received via the respective channels is correct. For example, it is assumed that instructions X and Y are instructions to be successively executed. In this case, if an instruction Z is received via the channel 2 immediately after the instruction X is received via the channel 1, the conventional IC card determines that the instructions should be executed in the order of X, Z. As a result, in the conventional IC card, there occurs a problem that the instructions X, Y cannot be correctly executed even if the instructions X, Y received via the channel 1 are set in the preset order.

BRIEF SUMMARY OF THE INVENTION

An object of this invention is to provide a portable electronic device and a control method of the portable electronic device that is highly convenient while maintaining a high security performance.

According to one aspect of the present invention, there is provided a portable electronic device which has a control element to perform various processes in response to commands supplied from an external device and includes a storage portion which stores history information indicating information relating to a command executed for each logical channel, a determining portion which determines validity of the command based on history information of a logical channel specified by the command stored in the storage portion when the command is supplied from the external device, a processing portion which performs a process corresponding to the command when the determining portion determines that the command is valid, and a holding portion which holds information relating to the command executed by the processing portion in the storage portion as history information of the logical channel.

According to another aspect of the present invention, there is provided a control method of a portable electronic device which is a method used for the portable electronic device having a control element which performs various processes in response to commands supplied from an external device and includes determining validity of a command based on history information of a logical channel specified by the command in a storage portion in which history information indicating information relating to a command executed for each logical channel is stored when the command is supplied from the external device, performing a process corresponding to the command when it is determined by the determining that the command is valid, and holding information relating to the executed command in the storage portion as history information of the logical channel.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

There will now be described an embodiment of this invention with reference to the accompanying drawings.

Figure 1:
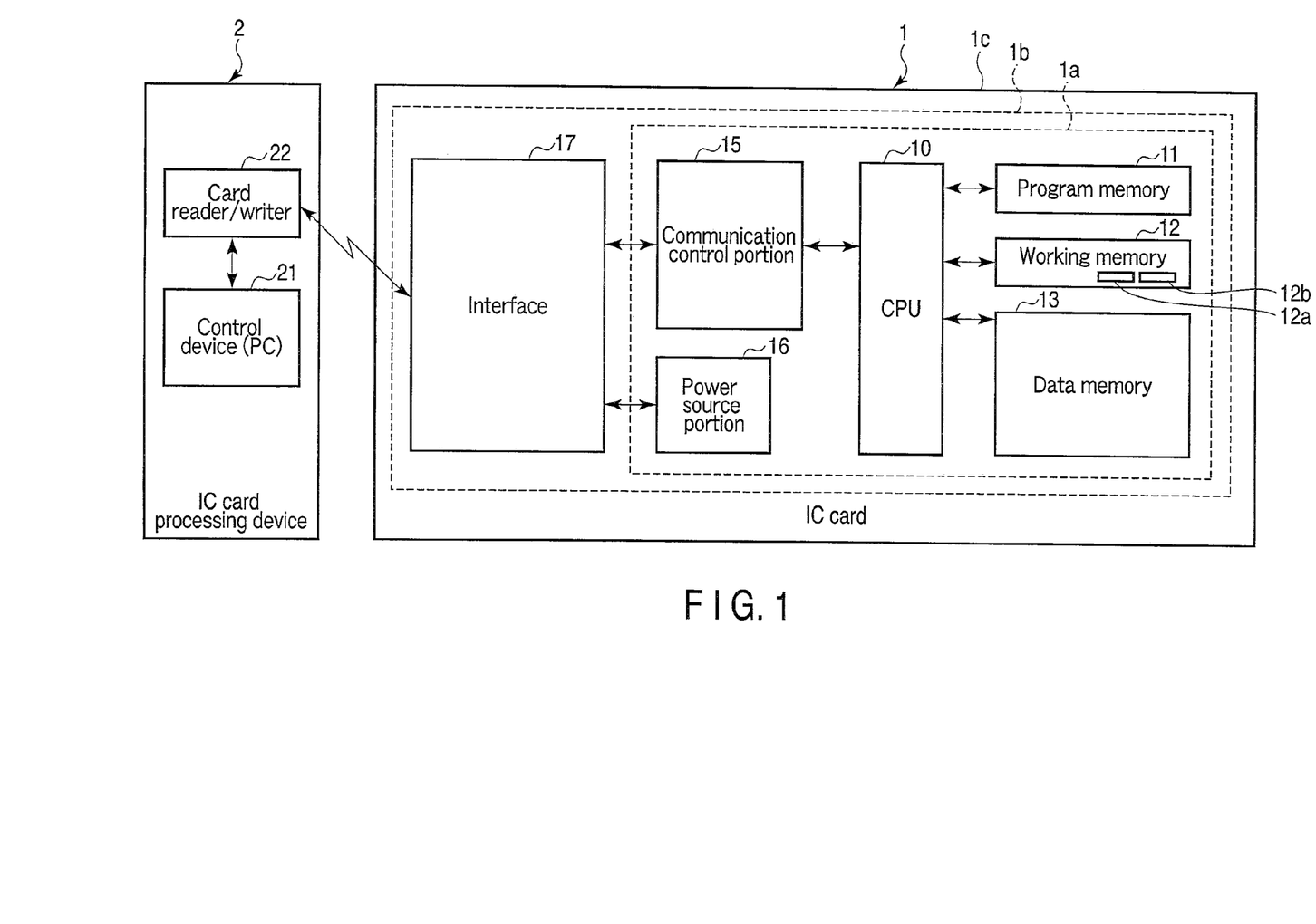
FIG. 1 is a block diagram schematically showing an example of the configuration of an IC card and an IC card processing device having a communication function with the IC card.

FIG. 1 is a block diagram showing an example of the configuration of an IC card 1 used as a portable electronic device according to this embodiment and an IC card system containing the IC card 1.

The IC card 1 is set into an operable state (activated) in response to electric power supplied from an IC card processing device 2 used as an external device. The IC card 1 set into the operable state performs various processes in response to various commands supplied from the IC card processing device 2. That is, the IC card processing device 2 supplies power to operate the IC card 1 and supplies commands that request the IC card 1 to perform various processes. The command supplied from the IC card processing device 2 to the IC card 1 requests a process corresponding to the application or operation condition.

Further, the IC card 1 may be a non-contact portable electronic device (non-contact IC card) that performs radio communication in a non-contact state with respect to the IC card processing device 2 by means of an antenna, radio communicating portion or the like or may be a contact portable electronic device (contact IC card) that is set in physical contact with the IC card processing device 2 to perform communication. Further, the IC card 1 may be a composite IC card (dual interface IC card) having a communication function of the non-contact IC card and a communication function of the contact IC card. In the present embodiment, a case wherein the non-contact IC card is used as an example is mainly explained. The non-contact IC card and contact IC card are different only in the communicating system with respect to the IC card processing device 2. Therefore, the embodiment explained below is similarly applied to the contact IC card.

Next, an example of the configuration of the IC card 1 is explained.

As shown in FIG. 1, the IC card 1 includes a CPU 10, program memory 11, working memory 12, data memory 13, communication control portion 15, power source portion 16 and interface 17.

Figure 2:
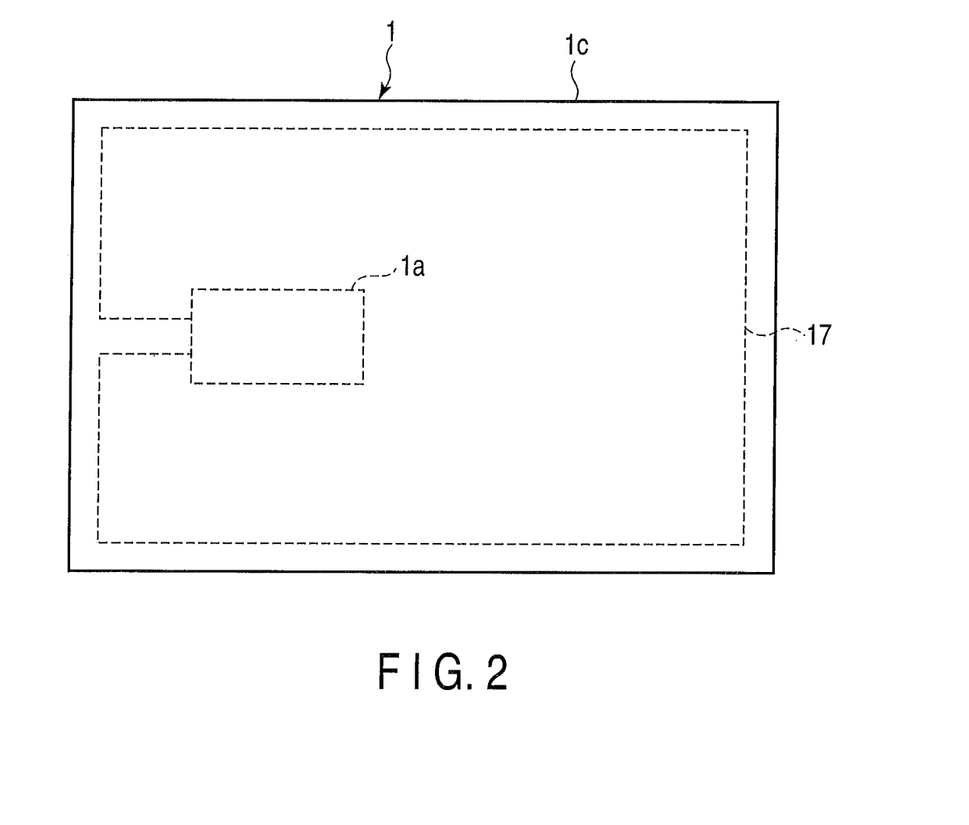
FIG. 2 is a block diagram schematically showing an example of the configuration of the IC card shown in FIG. 1.

Further, the IC card 1 is configured by a card-like main body 1c. The card-like main body 1c configuring the IC card 1 has one IC chip (or plural IC chips) 1a and antenna 17 embedded therein. The IC chip 1a is configured by the CPU 10, program memory 11, working memory 12, data memory 13, communication control portion 15, power source portion 16 and the like. The IC chip 1a is formed in a module form while it is connected to the antenna used as the interface 17. A module 1b having the IC chip 1a connected to the interface 17 is embedded in the card-like main body 1c that forms the IC card 1. For example, FIG. 2 is a diagram showing an example of the configuration of the whole portion of the non-contact IC card. The non-contact IC card shown in FIG. 2 has a card-like main body 1c. As shown by dotted lines in FIG. 2, in the main body 1c, a module 1b having one IC chip (or plural IC chips) 1a and antenna 17 is embedded.

The CPU 10 controls the whole portion of the IC card 1. The CPU 10 is operated based on a control program and control data stored in the program memory 11 or data memory 13. The CPU 10 performs a process corresponding to a command supplied from the IC card processing device 2 by executing the control program used to control the basic operation. Further, the CPU 10 performs a process corresponding to the application by executing the processing program installed according to the application of the IC card 1 or the like.

For example, if a command that requests data to be written into the data memory 13 from the IC card processing device 2, the CPU 10 performs a process of writing data into the data memory 13. Further, if a command that requests data stored in the data memory 13 to be read out is supplied from the IC card processing device 2, the CPU 10 performs a process of reading out data from the data memory 13. In addition, the CPU 10 has a function of determining the validity of a command to be executed based on history information of each logical channel as will be described later.

The program memory 11 is configured by a read only memory (ROM). In the program memory 11, a control program that controls the basic operation and control data are previously stored. That is, in the program memory 11, a control program and control data corresponding to the specification of the IC card 1 are previously stored. For example, the CPU 10 performs a process corresponding to a command supplied from the exterior according to the control program stored in the program memory 11. Further, in the program memory 11, information that specifies the attribute of a memory area in the data memory 13 is stored. In addition, in the program memory 11, information indicating a preset execution order of various commands for a specified process is stored. As one example of the above information, information indicating that a random number generation instruction (random number generation command) and external authentication instruction (external authentication command) should be executed in a preset execution order in the authentication process is stored in the program memory 11. In this case, the information indicating the preset execution order of the commands may be stored in the data memory 13.

The working memory 12 is configured by a nonvolatile memory (RAM: random access memory). The working memory 12 functions as a buffer memory that temporarily stores data. For example, in the working memory 12, data to be transmitted or received in the communication process with respect to the IC card processing device (external device) 2 is temporarily stored. Further, the working memory 12 can be utilized as a memory that temporarily stores various write data items or the like.

In the working memory 12, a logical channel management table 12a and history management table 12b are provided. In this example, it is assumed that the logical channel management table 12a and history management table 12b that are reset each time the IC card 1 is activated are provided in the working memory 12. The logical channel management table 12a or history management table 12b may be provided in the data memory 13. If the logical channel management table 12a and history management table 12b are provided in the data memory 13, information items stored in the logical channel management table 12a and history management table 12b are kept stored even if the power source to the IC card 1 is turned off.

In the logical channel management table 12a, information indicating the current state and security state of each logical channel is stored. That is, a current folder or current file of each logical channel is determined by referring to information stored in the logical channel management table 12a. Further, the security state of each logical channel is determined by referring to the logical channel management table 12a.

In the history management table 12b, history information is stored for each logical channel. The history information of each logical channel is information relating to a command executed for each logical channel. However, as the history information of each logical channel, it is necessary to hold an instruction code of the command to be referred to when at least the succeeding command is executed. For example, if the configuration is made to check only the order of a command that has been just executed and a command to be next executed, an instruction code of the command executed in an immediately preceding cycle is stored as history information. Further, if the configuration is made to check the execution result or the order of a command executed in an immediately preceding cycle and a command two or more cycles before the above command, the execution results and instruction codes of plural commands are held as history information.

The data memory (nonvolatile memory) 13 is a nonvolatile memory into which data can be written. For example, the data memory 13 is configured by an EEPROM, flash memory or the like. In the data memory 13, various information items corresponding to application purposes of the IC card 1 are stored. Further, in the data memory 13, a data table to store various setting information items is provided.

The application (for example, processing program, operation data or the like) corresponding to the application purpose of the IC card is stored in the data memory 13. Further, if the IC card 1 is used for a plurality of application purposes, a plurality of applications corresponding to the respective application purposes are stored in the data memory 13. The application corresponding to the application purpose of the IC card is stored in each file such as a program file and data file for each application purpose defined on the data memory 13. Such a file structure is based on ISO/IEC7816-4, for example. That is, in the data memory 13 of the IC card 1, various applications and various operation data items can be stored.

The communication control portion 15 controls data communication with respect to the external device (for example, the IC card processing device 2) via the interface 17. When receiving data from the external device, the communication control portion 15 demodulates transmission data as radio waves received via the interface 17 and supplies the demodulated signal to the CPU 10. Further, when transmitting data to the external device, the communication control portion 15 modulates data supplied from the CPU 10 and generates the modulated data as radio waves via the antenna used as the interface 17. In the case of the contact IC card, the interface 17 may be configured by a terminal that is physically set in contact with the contact portion of the external device.

The power source portion 16 generates power source voltage and clock pulses used to operate various portions of the IC card 1 based on radio waves received via the interface 17. The power source portion 16 supplies the power source voltage and clock pulses generated based on radio waves received via the antenna 17 to the respective portions. When the CPU 10 is started in response to supply of the power source voltage from the power source portion 16, it performs a process of resetting the processing state of the IC card 1. In the case of the contact IC card, the respective portions are operated in response to the power source voltage and clock pulses directly supplied from the external device via the interface 17.

Next, the IC card processing device 2 is explained.

As shown in FIG. 1, the IC card processing device 2 has a control device 21 and card reader/writer 22. The control device 21 is configured by a personal computer (PC), for example. The control device 21 is configured by an operation processing portion such as a CPU, various memories of a hard disk drive such as a RAM, ROM or nonvolatile memory, various interfaces such as a communication interface and the like. In the control device 21, various processes are performed by causing the operation processing portion to execute various control programs stored in the memory. Further, the control device 21 inputs or outputs data with respect to the card reader/writer 22 that performs data communication with the IC card 1.

For example, the control device 21 previously stores control programs corresponding to various processes using the IC card 1. Further, the control device 21 performs various processes using the IC card 1 by executing the above control programs. For example, in the various processes using the IC card 1, the control device 21 supplies preset commands in a preset procedure. The control device 21 performs various processes based on responses (information indicating process results with respect to the commands) from the IC card with respect to the above commands.

The card reader/writer 22 functions as a communicating portion that performs data communication with the IC card 1. The card reader/writer 22 is used to perform data communication based on a communication system corresponding to the communication system of the IC card 1. That is, the control device 21 performs data communication with the IC card 1 via the card reader/writer 22.

When the IC card 1 is a non-contact IC card, the card reader/writer 22 is configured by an antenna, communication control portion (modulation/demodulation circuit or the like) and the like that perform data communication by radio with the IC card 1. When data is transmitted to the non-contact IC card 1, the card reader/writer 22 modulates transmission data supplied from the control device 21 and transmits the thus modulated signal as radio waves from the antenna. Further, when data is received from the non-contact IC card 1, the card reader/writer 22 demodulates a signal as radio waves received via the antenna by use of the communication control portion and supplies demodulated data as received data to the control device 21. Also, the card reader/writer 22 transmits and receives the above data and, at the same time, transmits radio waves used as the power source voltage and clock pulses to operate the IC card 1 from the antenna.

When the IC card 1 is a contact IC card, the card reader/writer 22 is configured by a contact portion, communication control portion and the like that are physically set in contact with the IC card 1 to perform data communication. When data is transmitted or received with respect to the contact IC card, the contact portion of the card reader/writer 22 is physically set into contact with the contact portion provided on the IC card 1 side to perform various data communications. Further, in the card reader/writer 22, the power source voltage and clock pulses are supplied to the IC card 1 via the contact portion that is physically set into contact with the IC card 1.

Next, a first operation example of the IC card 1 is explained.

In the history management table 12b, information relating to commands executed for the respective logical channels is stored as history information. In the first operation example, the instruction code of the executed command and the execution result of the command are stored as history information for each logical channel in the history management table 12b. As described above, history information for each logical channel is information indicating the execution result and instruction code of the command to be referred to when at least the succeeding command is executed.

For example, as the history information for each logical channel, the execution result and instruction code of the command executed in an immediately preceding may be stored for each logical channel. As the history information for each logical channel, the execution results and instruction codes of commands executed after the IC card 1 is reset may be stored for each logical channel. As the history information for each logical channel, up to a preset number the execution results and instruction codes of commands executed before the present command is supplied may be stored for each logical channel.

The IC card 1 of the first operation example determines whether or not a received command (an instruction to be executed) is set in a preset execution order for each logical channel by referring to the history information (determines the validity of the received command) when a command supplied from the IC card processing device 2 is executed. For example, if the relation between the received command and the command executed in an immediately preceding cycle is checked, the IC card 1 reads out the execution result and instruction code of the command executed in the immediately preceding cycle in the logical channel of the received command based on the history information of the logical channel and confirms that the instruction code of the command executed in the immediately preceding cycle should be executed immediately before the command received in the preset execution order and the execution result of the command executed in the immediately preceding cycle indicates normal termination.

Figure 3:
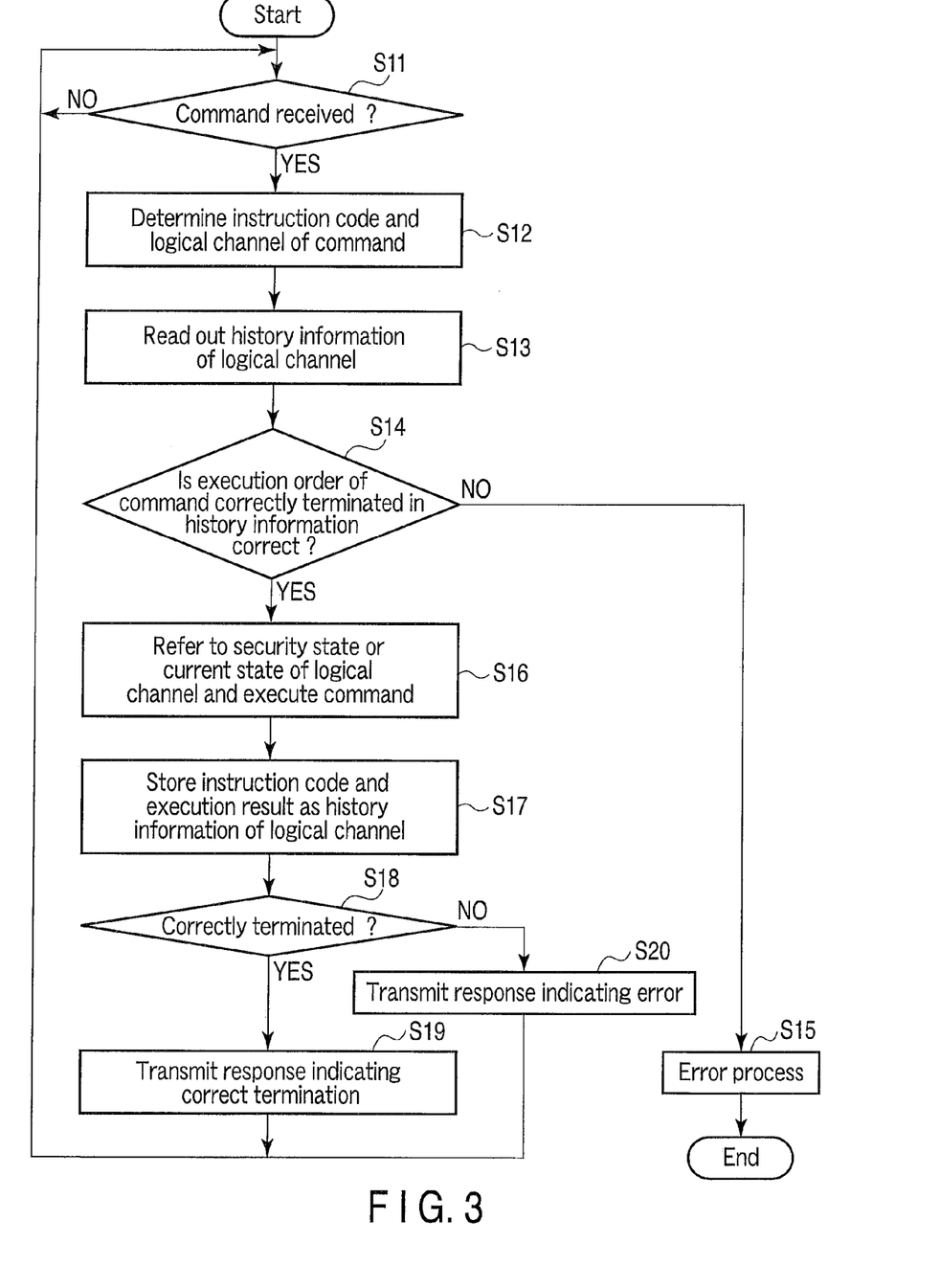
FIG. 3 is a flowchart for illustrating a first operation example of the IC card.

FIG. 3 is a flowchart for illustrating the first operation example of the IC card 1.

First, the IC card 1 receives a command transmitted from the IC card processing device 2 via the interface 17 and communication control portion 15 (YES in the step S11). When receiving a command from the IC card processing device 2, the CPU 10 of the IC card 1 determines the instruction code and logical channel of the command (step S12). If the logical channel of the received command is determined, the CPU 10 reads out history information of the logical channel (step S13). After reading out the history information of the logical channel, the CPU 10 determines (confirms) whether or not the execution order of the received command is a preset execution order based on the history information of the logical channel read out (step S14). In this determining step, the CPU 10 determines whether the order of the instruction code of the immediately preceding command that has been correctly terminated in the history information of the logical channel (or instruction codes of plural commands that have been correctly terminated up to the immediately preceding cycle) and the instruction code of the received command is the preset execution order or not.

When it is determined that the execution order of the received command is not correct (NO in the step S14), the CPU 10 performs an error process without performing a process corresponding to the command (step S15). In this case, for example, the CPU 10 performs a process of interrupting the operation of the CPU 10 as an error process. When a command whose execution order is not correct is received, the IC card 1 interrupts the operation. As a result, the IC card 1 can prevent occurrence of dishonest access. Further, as the error process, it may transmit a response to the effect that the process cannot be performed because the execution order of the received command is not correct to the IC card processing device 2.

When it is determined that the execution order of the received command is correct (YES in the step S14), the CPU 10 performs a process corresponding to the received command while referring to the current state or security state of the logical channel stored in the logical channel management table 12a (step S16).

For example, if the received command is a command for collation or authentication, the CPU 10 performs a process of collation or authentication corresponding to the command and updates the security state of the logical channel of the command stored in the logical channel management table 12a according to the execution result.

Further, if the received command is a command that requests access (for reading, writing, rewriting) to a file, the CPU 10 accesses a current folder or current file of the logical channel of the command stored in the logical channel management table 12a based on information indicating the current folder or current file of the logical channel specified by the command.

If the received command is a command for referring to the security state, the CPU 10 refers to the security state of logical channel of the command stored in the logical channel management table 12a and performs a process corresponding to the instruction code of the command.

Further, if the received command is a command that updates the current state of a folder or file, the CPU 10 updates the current state of the folder or file of the logical channel of the command stored in the logical channel management table 12a.

When the process corresponding to the received command is terminated, the CPU 10 stores the instruction code and execution result of the command as history information of the logical channel (step S17). That is, the CPU 10 stores the instruction code of the command and information (execution result) indicating that the process corresponding to the instruction code of the command is correctly or erroneously terminated as the history information of the logical channel relating to the received command in the history management table 12b.

Further, when the process corresponding to the received command is correctly terminated (YES in the step S18), the CPU 10 transmits response data indicating that the process is correctly terminated as a response with respect to the command to the IC card processing device 2 that is a transmission source of the command (step S19). When the process corresponding to the received command is erroneously terminated (NO in the step S18), the CPU 10 transmits response data indicating that the process is erroneously terminated as a response with respect to the command to the IC card processing device 2 that is a transmission source of the command (step S20).

By performing the above process, in the IC card 1 of the first operation example, the execution result and instruction code of the received (executed) command are stored as history information for each logical channel in the history management table 12b. Further, when executing a command supplied from the IC card processing device 2, the IC card 1 determines the validity of the received command according to whether or not the execution order of the received command is a preset execution order in the logical channel based on history information of each logical channel specified by the command.

Thus, in the IC card 1 of the first operation example, the execution order of the commands can be checked for the respective logical channels. Further, in the IC card 1, the process can be prevented from being performed in an incorrect order while access is admitted at desired timing for each logical channel.

Next, a second operation example of the IC card 1 is explained.

In the second operation example, information relating to commands executed for respective logical channels is stored as history information. In the second operation example, an instruction code of a command (a command whose execution result indicates correct termination) that is correctly terminated for each logical channel is stored as history information in the history management table 12b. As described above, an instruction code of a command to be referred to when at least the following command is executed is stored as the history information of each logical channel in the history management table 12b.

For example, as the history information for each logical channel, an instruction code of a command that is executed in an immediately preceding and is correctly terminated may be stored for each logical channel. As the history information for each logical channel, instruction codes of commands that are executed after the IC card 1 is reset and is correctly terminated may be stored for each logical channel. As the history information for each logical channel, up to a preset number instruction codes of commands that have been executed before the present command is supplied and is correctly terminated may be stored for each logical channel.

The IC card 1 in the second operation example refers to the above history information when it executes a command supplied from an IC card processing device 2. Then, the IC card 1 determines whether or not a received command (an instruction to be executed) is set in a preset execution order for each logical channel. For example, when the relation between the received command and the command executed in the immediately preceding cycle is checked, the IC card 1 reads out an instruction code of a command that is executed in an immediately preceding cycle in the logical channel of the received command from the history information of the logical channel. After reading out the history information, the IC card 1 determines that the instruction code of the command executed in an immediately preceding cycle should be executed immediately before the command received in the preset execution order.

Figure 4:
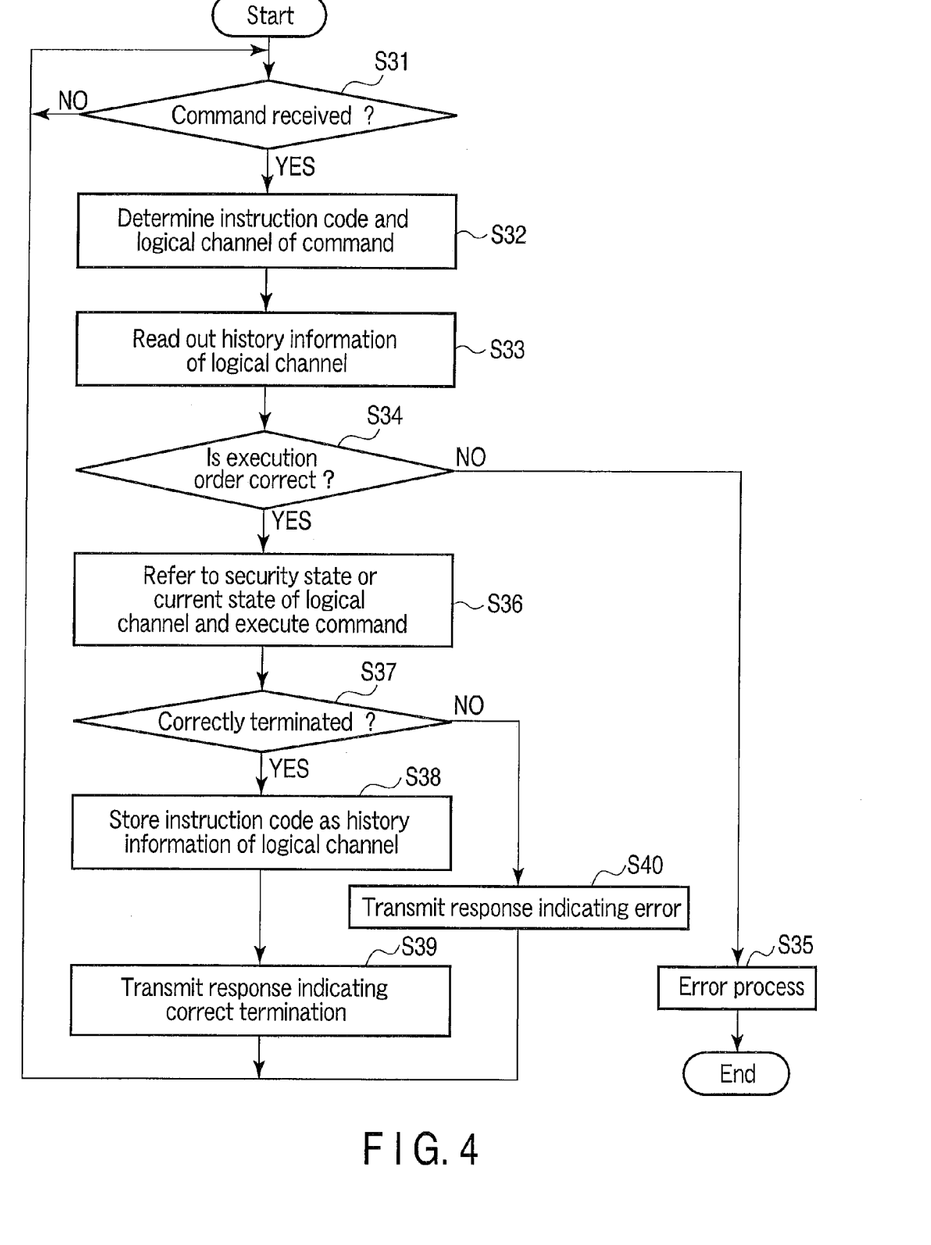
FIG. 4 is a flowchart for illustrating a second operation example of the IC card.

FIG. 4 is a flowchart for illustrating the second operation example of the IC card 1. In this case, since the processes of the steps S31 to S33, S35 to S36 and S39 to S40 are substantially the same as the processes of the steps S11 to S13, S15 to S16 and S19 to S20 shown in FIG. 3, the detail explanation thereof is omitted.

When receiving a command from the IC card processing device 2 (YES in the step S31), the CPU 10 of the IC card 1 determines an instruction code and logical channel of the command (step S32) and reads out history information of the logical channel (step S33).

When reading out the history information of the logical channel, the CPU 10 determines whether or not the order of the instruction code of the immediately preceding command that is correctly terminated in the history information of the logical channel (or the instruction codes of plural commands that are correctly terminated up to the immediately preceding cycle) and the instruction code of the received command is a preset execution order (step S34).

When it is determined that the execution order of the received command is not correct (NO in the step S34), the CPU 10 performs an error process without performing a process corresponding to the command (step S35). In this case, for example, the CPU 10 performs a process of interrupting the operation as an error process. When a command whose execution order is not correct is received, the IC card 1 interrupts the operation. As a result, the IC card 1 can prevent occurrence of dishonest access. Further, as the error process, it may transmit a response to the effect that the process cannot be performed because the execution order of the received command is not correct to the IC card processing device 2.

When it is determined that the execution order of the received command is correct (YES in the step S37), the CPU 10 stores the instruction code of the command as the history information of the logical channel in the history management table 12*b* (step S38). That is, the CPU 10 stores the instruction code of the command that is correctly terminated as the history information of the logical channel of the command in the history management table 12*b*. Further, if a process corresponding to the received command is correctly terminated (YES in the step S37), the CPU 10 transmits response data indicating that the process is correctly terminated as a response with respect to the command to the IC card processing device 2 that is a transmission source of the command (step S39).

When the process corresponding to the received command is erroneously terminated (NO in the step S37), the CPU 10 transmits response data indicating that the process is erroneously terminated as a response with respect to the command to the IC card processing device 2 that is a transmission source of the command without storing information relating to the command in the history management table 12*b* (step S40).

As described above, in the IC card 1 of the second operation example, the instruction codes of the commands that are correctly terminated are stored as history information for the respective logical channels in the history management table 12*b*. Further, when executing a command supplied from the IC card processing device 2, the IC card 1 of the second operation example determines the validity of the received command according to whether or not the execution order of the received command is a preset execution order in the logical channel based on history information of a logical channel specified by the received command.

Thus, the IC card 1 of the second operation example can check the execution order of the commands for the respective logical channels. Further, the IC card 1 can prevent the process from being performed in an incorrect order while access is admitted at desired timing for each logical channel.

In the second operation example, the above process can be performed by storing only the instruction codes of the commands that are correctly terminated in the history management table 12*b*. That is, in the second operation example, the history management table 12*b* can be configured by use of less memory capacity.

As described above, the IC card 1 according to the present embodiment can hold a current state or security state for each logical channel. The IC card 1 stores the execution result and instruction code of the command that is correctly terminated as history information for each logical channel in the history management table 12*b*. When executing the command supplied from the IC card processing device 2, the IC card 1 determines whether or not the execution order of the received command is a preset execution order in the logical channel based on the history information for each logical channel specified by the command.

The IC card 1 according to the present embodiment can check the execution order of the commands for respective logical channels. Further, the IC card 1 can prevent the process from being performed in an incorrect order while access is admitted at desired timing for each logical channel.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An IC card comprising:
   a storage portion which stores history information indicating a last command executed for each of a plurality of logical channels;
   a memory which stores a preset execution order for executing a plurality of commands for each of the logical channels;
   an interface which receives a command supplied from an external device;
   a determining portion which determines whether or not executing the received command next to be executed is in a correct execution order, based on the stored history information of a command executed in an immediately preceding cycle of a logical channel specified by the received command and based on that the command executed in the immediately preceding cycle should be executed immediately before the command received in the preset execution order stored in said memory for the specified logical channel;

a processing portion which performs a process corresponding to the command if the determining portion determines that to execute the received command next is in the preset execution order; and a holding portion which stores information indicating the command executed by the processing portion in the storage portion as history information indicating the last command executed for the logical channel.

2. The IC card according to claim 1, wherein the holding portion stores an execution result and instruction identification information of a command executed for each logical channel in the storage portion as history information.

3. The IC card according to claim 1, wherein the holding portion stores instruction identification information of a command which is correctly terminated for each logical channel in the storage portion as history information.

4. The IC card according to claim 1, wherein the holding portion stores an execution result and instruction identification information of a command to be referred to by a following command for each logical channel in the storage portion.

5. The IC card according to claim 1, wherein the storage portion stores history information indicating the last command executed for each logical channel and a command executed before the last command executed for each logical channel, and the determining portion determines whether or not executing the received command next is a correct execution order according to whether an execution order of the commands in the logical channel is the preset execution order.

6. The IC card according to claim 1, further comprising a module having the above portions, and a main body containing the module.

7. A control method used for an IC card having a control element which performs various processes according to commands supplied from an external device, comprising:

storing history information in a storage portion of the IC card indicating a last command executed for each of a plurality of logical channels;

storing in a memory a preset execution order for executing a plurality of commands for each of the logical channels;

determining whether or not executing the supplied command next to be executed is in a correct execution order, based on the stored history information of a command executed in an immediately preceding cycle of a logical channel specified by the received command and based on that the command executed in the immediately preceding cycle should be executed immediately before the command received in the preset execution order stored in said memory for the specified logical channel;

performing a process corresponding to the received command if the determining determines that to execute the received command next is in the preset execution order; and storing information indicating the executed command in the storage portion as history information indicating the last command executed for the logical channel.

8. The control method according to claim 7, wherein the storing information stores an execution result and instruction identification information of a command executed for each logical channel in the storage portion as history information.

9. The control method according to claim 7, wherein the storing information stores instruction identification information of a command which is correctly terminated for each logical channel in the storage portion as history information.

10. The control method according to claim 7, wherein the storing information stores an execution result and instruction identification information of a command to be referred to by a following command for each logical channel in the storage portion.

11. The control method according to claim 7, wherein the storage portion stores history information indicating the last command executed for each logical channel and a command executed before the last command executed for each logical channel, and the determining determines whether or not executing the received command next is a correct execution order according to whether an execution order of the commands in the logical channel is the preset execution order.

12. The control method according to claim 7, further comprising a module having the control element and the storage portion and a main body containing the module.

13. A portable electronic device comprising:

a storage portion which stores history information indicating a last command executed for each of a plurality of logical channel channels;

a memory which stores a preset execution order for executing a plurality of commands for each of the logical channel;

an interface which receives from an external device a command specified for a logical channel;

a determining portion which determines whether or not executing the received command next to be executed is in a correct execution order, based on the stored history information of a command executed in an immediately preceding cycle of a logical channel specified by the received command and based on that the command executed in the immediately preceding cycle should be executed immediately before the command received in the preset execution order stored in said memory for the specified logical channel;

a processing portion which performs a process corresponding to the command if the determining portion determines that to execute the received command next is in the preset execution order; and a holding portion which stores information indicating the command executed by the processing portion in the storage portion as history information indicating the last command executed for the logical channel.

* * * * *